United States Patent [19]

Kurihara et al.

[11] Patent Number: 4,965,730
[45] Date of Patent: Oct. 23, 1990

[54] VEHICLE-RUNNING CONTROL SYSTEM

[75] Inventors: Kazumasa Kurihara; Kenji Arai, both of Higashimatsuyama, Japan

[73] Assignee: Diesel Kiki Co., Ltd., Tokyo, Japan

[21] Appl. No.: 260,392

[22] Filed: Oct. 20, 1988

[30] Foreign Application Priority Data

Oct. 30, 1987 [JP] Japan ................................ 62-273455

[51] Int. Cl.$^5$ ...................... G05D 29/00; F02D 33/00; B60K 28/10
[52] U.S. Cl. ................. 364/431.09; 74/866; 192/0.052; 364/424.1
[58] Field of Search ........................ 364/424.1, 431.09; 192/0.052, 0.076; 74/866; 123/198 DB, 359

[56] References Cited

U.S. PATENT DOCUMENTS

| | | | |
|---|---|---|---|
| 4,469,065 | 9/1984 | Hasegawa et al. | 123/359 |
| 4,515,125 | 5/1985 | Buck et al. | 123/359 |
| 4,519,353 | 5/1985 | Ito et al. | 123/359 |
| 4,539,643 | 9/1985 | Suzuki et al. | 364/431.09 |
| 4,559,914 | 12/1985 | Flaig et al. | 123/359 |
| 4,714,145 | 12/1987 | Kurihara et al. | 192/0.052 |

FOREIGN PATENT DOCUMENTS 3636952 7/1987 Fed. Rep. of Germany .
61-1851 7/1986 Japan .
61-1852 7/1986 Japan .
2133906 1/1984 United Kingdom .

OTHER PUBLICATIONS

Patent Abstracts of Japan, vol. 10, No. 146 (M-482) [2203], May 28th, 1986, p. 43, M482; & JP-A-61 (Diesel Kiki K.K.), 01-07-86.

Primary Examiner—Felix D. Gruber

[57] ABSTRACT

In a vehicle-running control system, an engine combustion control device includes a malfunction detector for detecting a malfunction of the engine combustion control device, and an engine-combustion stopping unit operative in response to a malfunction detecting signal from the malfunction detector to stop combustion in the engine. A clutch control device has an urgent clutch switching unit which responds to the malfunction detecting signal to output a control signal for bringing a clutch to its engaged position, to an actuator of the clutch control device. A transmission control device has an urgent gear-position switching unit which responds to the malfunction detecting signal to output a control signal for bringing the gear position to one different from a neutral, to an actuator of the transmission control device.

3 Claims, 5 Drawing Sheets

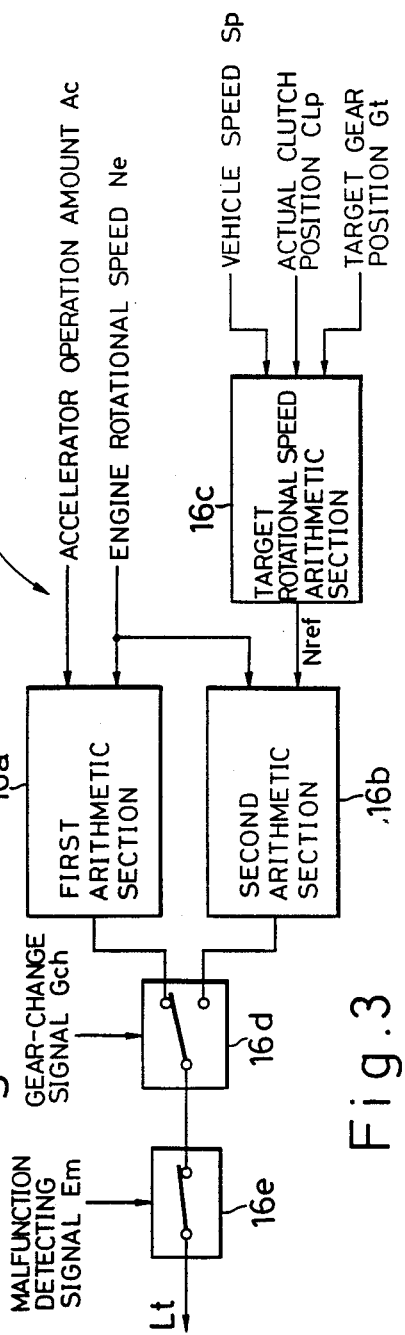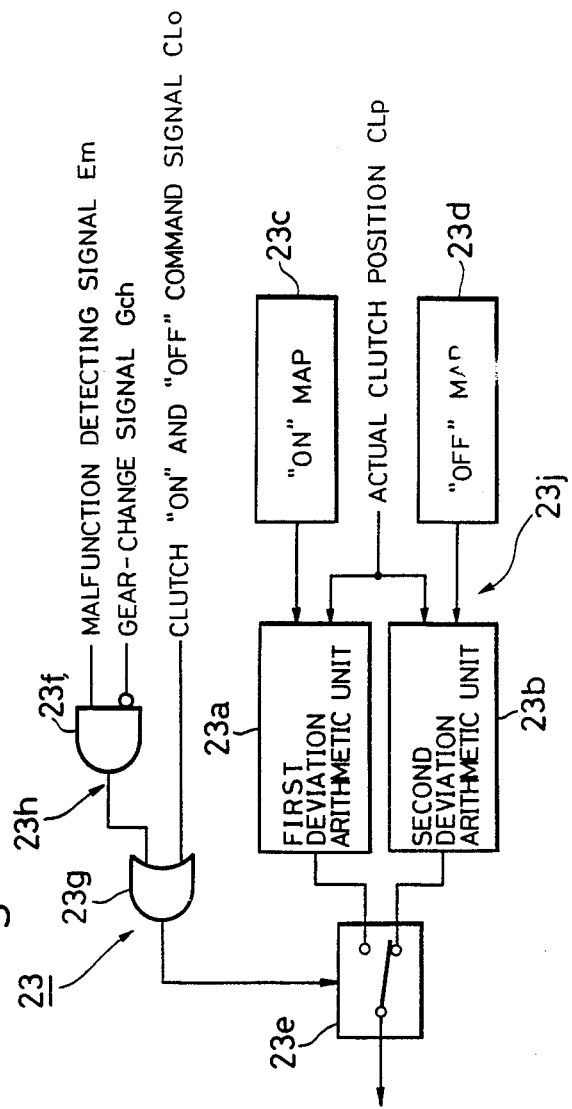

VEHICLE-RUNNING CONTROL SYSTEM

BACKGROUND OF THE INVENTION

The present invention relates to a vehicle-running control system for electronically controlling an engine, a transmission and a clutch.

A vehicle-running control system for electronically controlling an engine, a transmission and a clutch is known well. In the known system, Japanese Patent Application Laid-Open Nos. 61-1851 and 61-1852 disclose a technique in which when a malfunction occurs in an engine combustion control device, the malfunction is detected to stop or suspend combustion in the engine, thereby enhancing safety of the vehicle running.

Inconvenience occurs, however, in case where the vehicle-running control system disclosed in the above patents is applied to a vehicle having installed thereon a power steering device and/or a power brake device which are known well. Specifically, rotation of the engine, for example, is transmitted to the power steering device to actuate a hydraulic pump thereof such that hydraulic pressure obtained by the hydraulic pump is utilized as a power source for steering the vehicle. On the other hand, the power brake device employs its power source such as, for example, negative pressure or vacuum at an intake manifold connected to the engine, or compressed air pressure generated by a compressor to which the engine rotation is transmitted. When the combustion in the engine is suspended during an emergency rotation of an axle is not transmitted to the engine if the gear position of the transmission is a neutral or the clutch is in a disengaged position As a result, power used in the power steering device and/or the power brake device is reduced or weakened, resulting in a deterioration of maneuverability of the vehicle.

SUMMARY OF THE INVENTION

It is an object of the invention to provide a vehicle-running control system capable of ensuring to operate vehicle maneuvering means employing power produced due to rotation of an engine, even if combustion in the engine is stopped or suspended.

According to the invention, there is provided a system for controlling running of a vehicle which includes an engine, shaft means drivingly connected to the engine, wheel means mounted on the shaft means for rotation therewith, vehicle maneuvering means employing power produced due to rotation of the engine, a clutch interposed between the engine and the shaft means, the clutch being capable of occupying an engaged position and a disengaged position, and a transmission interposed between the clutch and the shaft means, the transmission being capable of selecting a plurality of gear positions including a neutral, the system comprising:

(a) an engine-combustion control device including malfunction detecting means for detecting a malfunction of the engine combustion control device, and engine-combustion stopping means for stopping combustion in the engine in response to a malfunction detecting signal from the malfunction detecting means;

(b) a clutch control device including normal clutch control means outputting a control signal representative of the engaged and disengaged positions of the clutch, and an actuator for actuating the clutch on the basis of a control signal from the normal clutch control means; and (c) a transmission control device including normal transmission control means for determining a gear position of the transmission to output a control signal, and an actuator for changing the gear position of the transmission on the basis of the control signal from the normal transmission control means, wherein the clutch control means has urgent clutch switching means which is operative in response to the malfunction detecting signal from the malfunction detecting means to output a control signal for bringing the clutch to the engaged position, to the actuator of the clutch control device, and wherein the transmission control device has emergency gear-position switching means which is operative in response to the malfunction detecting signal from the malfunction detecting means to output a control signal for bringing the gear position to one different from the neutral, to the actuator of the transmission control device.

BRIEF DESCRIPTION OF THE DRAWINGS

FIG. 2 is a circuit block diagram showing a detailed arrangement of a target rack position arithmetic unit illustrated in FIG. 1;

FIG. 3 is a circuit block diagram showing a detailed arrangement of a clutch control unit illustrated in FIG. 1;

DETAILED DESCRIPTION

Embodiments of the invention will be described with reference to the accompanying drawings.

Figure 1:
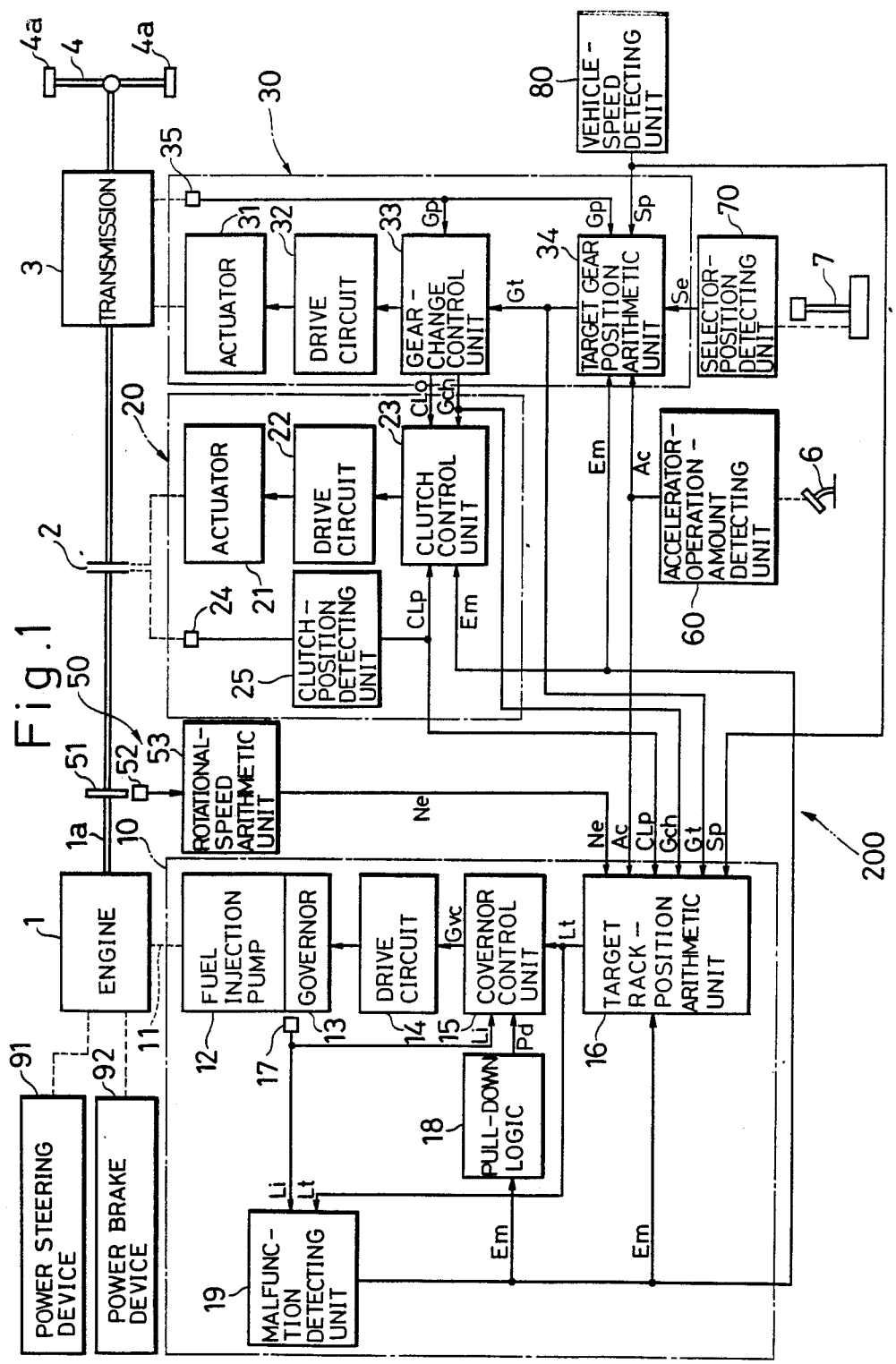
FIG. 1 is a circuit block diagram showing an embodiment of a vehicle-running control system according to the invention.

Referring first to FIGS. 1 through 4, in particular, to FIG. 1, there is shown a running control system installed on a vehicle. The vehicle comprises a diesel engine 1, a clutch 2 and a transmission 3. The clutch 2 is drivingly connected to an output shaft 1a of the engine 1, and the transmission 3 is interposed between the clutch 2 and an axle 4 on which a pair of wheels 4a are mounted. The transmission 3 can select a plurality of gear positions including a neutral. Installed on the vehicle is vehicle maneuvering means including a power steering device 91 and a power brake device 92 which are well known.

The vehicle-running control system comprises an engine-combustion control device 10 for electronically controlling fuel supply to the engine 1, a clutch control device 20 for electronically controlling the clutch 2, and a transmission control device 30 for electronically controlling the transmission 3.

The vehicle-running control system further comprises a rotational-speed detecting device 50 for detecting rotational speed of the engine 1. The rotational-speed detecting device 50 has a pulser 51, an electromagnetic pickup element 52 and a rotational-speed arithmetic unit 53. The pulser 51 is fixedly mounted to the output shaft 1a of the engine 1 or to a camshaft (not shown) of a fuel injection pump 12 interlocked with the output shaft 1a. The fuel injection pump 12 will be described later. A plurality of cogs (not shown) are arranged on a peripheral surface of the pulser 51 in equidistantly spaced relation to each other. The electromagnetic pickup element 52 is arranged in the vicinity of the peripheral surface of the pulser 51 such that a pulse is outputted each time each cog passes by the pickup element 52. Pulses from the electromagnetic pickup element 52 are inputted to the rotational-speed arithmetic unit 53. The rotational-speed arithmetic unit 53 measures a time interval between each pair of adjacent pulses from the pickup element 52. The rotational-speed arithmetic unit 53 calculates rotational speed Ne of the engine 1 on the basis of the measured data, to output a signal representative of the rotational speed Ne.

The vehicle-running control system further comprises an accelerator-operation-amount detecting unit 60, a selector-position detecting unit 70, and a vehicle-speed detecting unit 80. The accelerator-operation-amount detecting unit 60 detects an operation amount Ac of an accelerator 6 to output a signal indicative of the operation amount Ac. The selector-position detecting unit 70 detects an operating position Se of a selector lever 7 for selecting a range of the gear position, to output a signal representative of the operating position Se. The vehicle-speed detecting unit 80 outputs a signal indicative of a vehicle speed Sp, and is constructed similarly to the aforesaid rotational-speed detecting device 50. A pulser (not shown) of the vehicle-speed detecting unit 80 is mounted to an output shaft of the transmission 3. In this connection, it is to be understood that the vehicle-speed detecting unit 80 may calculate the vehicle speed Sp on the basis of the rotational speed Ne from the rotational-speed detecting unit 50 and the gear position of the transmission 3.

The engine-combustion control device 10 has the aforesaid fuel injection pump 12 which is connected, through a pipe 11, to injection valves (not shown) associated respectively with a plurality of cylinders of the engine 1. The fuel injection pump 12 has a control rack (not shown) for adjusting a fuel injection amount. Position of the control rack is electronically controlled by a governor 13. The governor 13 has an actuator (not shown) whose drive circuit 14 is supplied with a control signal Gvc from a governor control unit 15. Inputted to the governor control unit 15 are a signal indicative of a target rack position Lt from a target rack-position arithmetic unit 16, and a signal indicative of an actual rack position Li from a position sensor 17 for detecting the position of the control rack. The governor control unit 15 executes PID calculation on the basis of a deviation between the target rack position Lt and the actual rack position Li, to output the governor control signal Gvc to the drive circuit 14. The actuator of the governor 13 controls the control rack so as to bring the same into coincidence with the target rack position.

As shown in FIG. 2, the target rack-position arithmetic unit 16 has a pair of first and second arithmetic sections 16a and 16b.

The first arithmetic section 16a calculates an optimum fuel injection amount on the basis of the accelerator operation amount Ac from the accelerator-operation-amount detecting unit 60 and the engine rotational speed Ne from the rotational-speed detecting unit 50. The first arithmetic section 16a further calculates the target rack position corresponding to the optimum fuel injection amount.

The second arithmetic section 16b executes PID calculation on the basis of a deviation between the engine rotational speed Ne from the rotational-speed detecting device 50 and target rotational speed Nref from a target rotational-speed arithmetic section 16c, to obtain the target rack position. The target rotational-speed arithmetic section 16c executes calculation on the basis of the vehicle speed Sp from the vehicle-speed detecting unit 80, and an actual clutch position CLp and a target gear position Gt to be described later, to output a signal representative of the target rotational speed Nref.

The signals outputted respectively from the first and second arithmetic sections 16a and 16b are sent to a switch 16d. The switch 16d occupies an illustrated position during normal running of the vehicle, not during gear change, to select the signal indicative of the target rack position Lt from the first arithmetic section 16a. As a result, there is obtained an optimum fuel injection amount corresponding to the accelerator operation amount Ac and the engine rotational speed Np. On the other hand, during the gear change, the switch 16d is switched in response to a gear change signal Gch to be described later, to select the signal representative of the target rack position Lt from the second arithmetic section 16b. As a result, the engine rotational speed is so controlled as to enable the gear change and the operation bringing the clutch 2 to the engaged position, to be carried out smoothly, and is prevented from being abnormally raised instantaneously.

Another switch 16e is connected to the output side of the signal selecting switch 16d, and is so designed as to be switched off in response to a malfunction detecting signal Em to be described later, to prevent the target rack-position signal Lt from being outputted.

Referring back to FIG. 1, the engine-combustion control device 10 further comprises a malfunction detecting unit 19 for detecting a malfunction of the engine-combustion control device 10 to output the aforesaid malfunction detecting signal Em, and a pull-down logic 18 serving as engine-combustion stopping means.

Specifically, the malfunction detecting unit 19 detects a malfunction of the rack position sensor 17. When the malfunction occurs in the rack position sensor 17, the actual rack position Li from the rack position sensor 17 is not brought into coincidence with the target rack position Lt from the target rack-position arithmetic unit 16. The malfunction detecting unit 19 compares the target rack-position signal Lt and the actual rack position signal Li with each other, to output the malfunction detecting signal Em when it is judged that a state, in which a deviation between both the signals Lt and Li exceeds a predetermined value, continues for a predetermined period of time. The malfunction detecting signal Em is sent to the switch 16e (see FIG. 2) of the target rack-position arithmetic unit 16 as described previously, to switch off the switch 16e. Accordingly, outputting of the target rack-position signal Lt is interrupted. At the same time, the pull-down logic 18 responds to the malfunction detecting signal Em to send a pull-down signal Pd to the governor control unit 15. The governor control unit 15 receives the pull-down signal Pd to control the actuator of the governor 13 in such a manner as to pull the control rack to a position corresponding to zero of the fuel injection amount. As a result, the fuel injection amount from the fuel injection pump 12 to the engine 1 is brought to zero, to stop the combustion in the engine 1.

The clutch control device 20 described above comprises, as shown in FIG. 1, an actuator 21, a clutch control unit 23 outputting a clutch control signal to a drive circuit 22 for the actuator 21, a clutch sensor 24, and a clutch-position detecting unit 25 for detecting a position of the clutch 2 on the basis of a signal from the clutch sensor 24 to output a signal representative of the actual clutch position CLp.

The clutch control unit 23 has a pair of first and second deviation arithmetic units 23a and 23b as shown in FIG. 3. The first deviation arithmetic unit 23a compares the actual clutch position CLp from the clutch-position detecting unit 25 with the target clutch position with respect to a time elapsing from an "ON" initiating point of time indicated on an "ON" map 23c, to output a control signal so as to eliminate a deviation between the target clutch position and the actual clutch position CLp. Thus, the clutch 2 is controlled in accordance with the "ON" map 23c, and is brought to the engaged position. Likewise, the second deviation arithmetic unit 23b outputs such a control signal as to bring the clutch 2 to the disengaged position in accordance with an "OFF" map 23d.

The control signals from the respective first and second deviation arithmetic units 23a and 23b are selected by a switch 23e. The selecting operation of the switch 23e is normally executed on the basis of a clutch "ON" and "OFF" command signal CLo from the transmission control device 30 to be descried later. The signal CLo represents a clutch "ON" command when the signal CLo is at a high level, and represents a clutch "OFF" command when the signal CLo is at a low level. When the clutch "ON" and "OFF" command signal CLo is at the H-level, an output from the first deviation arithmetic unit 23a is sent to the drive circuit 22 to bring the clutch 2 to the engaged position. On the other hand, when the clutch "ON" and "OFF" command signal is at the L-level, an output from the second deviation arithmetic unit 23b is sent to the drive circuit 22 to bring the clutch 2 to the disengaged position.

The aforesaid components including the first deviation arithmetic unit 23a, the second deviation arithmetic unit 23b, the "ON" map 23c, the "OFF" map 23d and the switch 23e form normal clutch control means 23j.

The clutch control unit 23 of the clutch control device 20 further has an emergency clutch switching means 23h composed of an AND circuit 23f and an OR circuit 23g. The malfunction detecting signal Em is inputted to one of a pair of input terminals of the AND circuit 23f. The gear-change signal Gch to be described later is inverted and is inputted to the other input terminal of the AND circuit 23f. An output from the AND circuit 23f is inputted to one of a pair of input terminals of the OR circuit 23g. The clutch "ON" and "OFF" command signal CLo is inputted to the other input terminal of the OR circuit 23g.

When a malfunction occurs at the engine combustion control device 10, the emergency clutch switching means 23h operates in the following manner. That is, the malfunction detecting signal Em from the malfunction detecting unit 19 is sent to the AND circuit 23f. The output from the AND circuit 23f is brought to the high level during a period for which the AND circuit 23f receives the malfunction detecting signal Em, but does not receive the gear-change signal Gch representing the midst of gear change. If, at this time, the clutch 2 is in the disengaged position, the switch 23e is switched to send the output from the first deviation arithmetic unit 23a to the drive circuit 22, thereby switching the clutch to the engaged position. On the other hand, when the AND circuit 23f receives the malfunction detecting signal Em, the output from the AND circuit 23f is not brought to the high level during the period for which the AND circuit 23f receives the gear-change signal Gch, so that the clutch 2 is maintained at its disengaged position. After a wait for completion of outputting of the gear-change signal Gch, the output from the AND circuit 23f is brought to the high level, to switch the clutch 2 to the engaged position.

The aforementioned transmission control device 30 includes, as shown in FIG. 1, an actuator 31, a gear-change control unit 33 outputting a control signal to a drive circuit 32 for the actuator 31, a target gear-position arithmetic unit 34 outputting a signal representative of a target gear-position Gt to the gear-change control unit 33, and a gear position sensor 35 for detecting the gear position to output a signal representative of an actual gear-position Gp. The gear-change control unit 33 compares the actual gear position Gp with the target gear position Gt to output the control signal to the drive circuit 32. In response to the control signal, the actuator 31 is operated to bring the transmission 3 to the target gear position. At this gear change, the clutch "ON" and "OFF" command signal CLo for switching the clutch 2 between the engaged and disengaged positions and the gear change signal Gch indicative the midst of control of the gear change are outputted from the gear-change control unit 33 to the clutch control unit 23.

Figure 4:
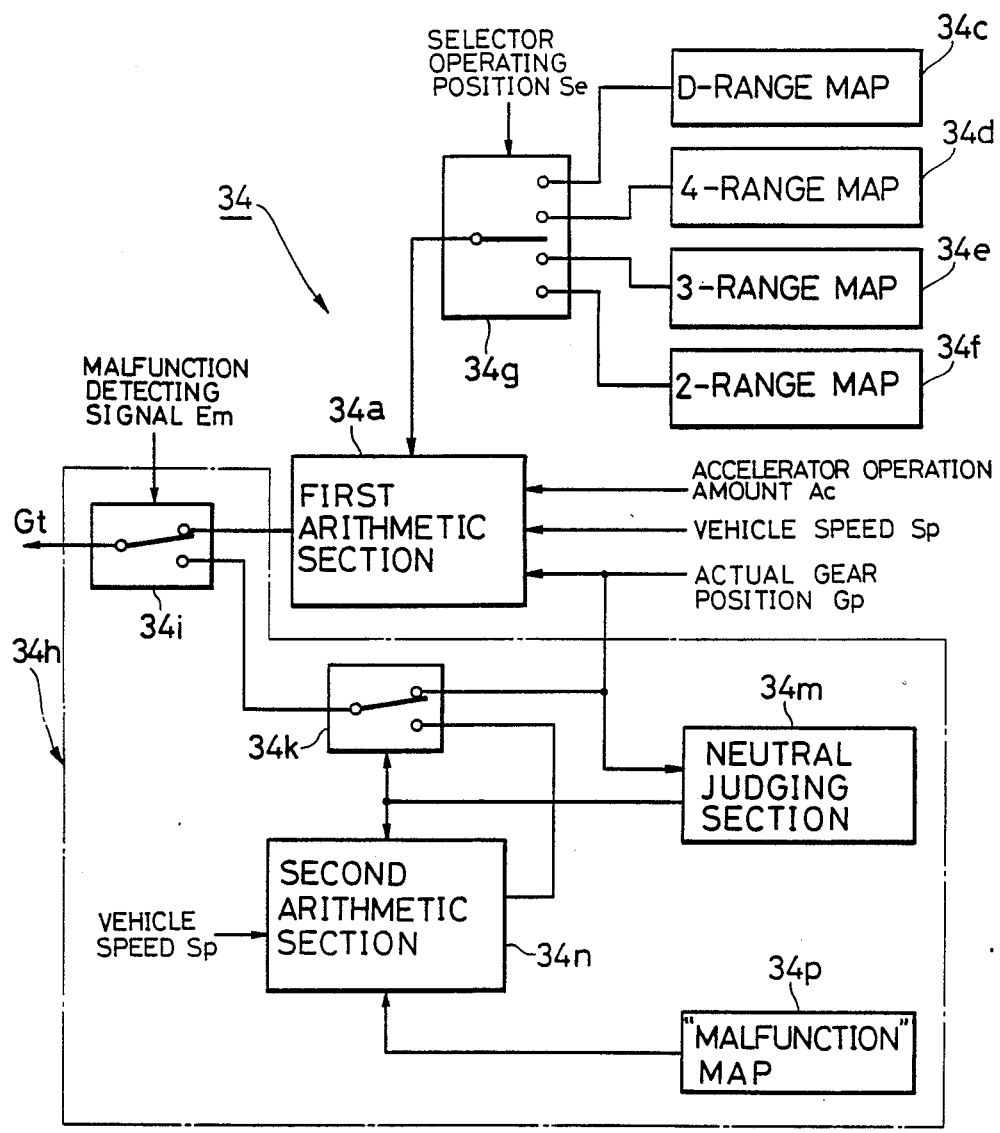
FIG. 4 is a circuit block diagram showing a detailed arrangement of a target gear-position arithmetic unit illustrated in FIG. 1.

The target gear-position arithmetic unit 34 has a first arithmetic section 34a serving as normal transmission control means as shown in FIG. 4. Inputted to the first arithmetic section 34a are signals respectively representative of the accelerator operation amount Ac, the vehicle speed Sp and the actual gear position Gp. Information in any one of a plurality of maps 34c, 34d, 34e and 34f having their respective ranges of gear position is selected by a switch 34g on the basis of the selector operating position Se, and is inputted to the first arithmetic section 34a. The first arithmetic section 34a substitutes the accelerator operation amount Ac and the vehicle speed Sp into the selected map to obtain an optimum gear position, and to further obtain a final target gear position on the basis of comparison between the optimum gear position and the actual gear position Gp.

Normally, the signal representative of the target gear position Gt obtained in the manner described above is sent to the gear-change control unit 33.

The target gear-position arithmetic unit 34 further has urgent gear-position switching means 34h which includes a pair of switches 34i and 34k, a neutral judging section 34m, a second arithmetic section 34n, and a "malfunction" map 34p. The "malfunction" map 34p indicates the relationship between the vehicle speed Sp and the target gear position Gt.

The emergency gear position switching means 34h will be described in detail. The neutral judging section 34m receives the actual gear-position signal Gp to judge whether or not the gear position is neutral. The second arithmetic unit 34n calculates a target gear position at occurrence of a malfunction, on the basis of the vehicle speed signal Sp and the "malfunction" map 34p, during a period for which the second arithmetic section 34n receives a neutral signal from the neutral judging section 34m. The switch 34i selects an output from the switch 34k in place of an output from the first arithmetic section 34a, when the switch 34i receives the malfunction detecting signal Em. The switch 34k is in the illustrated position when the switch 34k does not receive the neutral signal from the neutral judging section 34m, so that the actual gear position Gp becomes the target gear position Gt as it is. As a result, even after a malfunction occurs at the engine-combustion control device 10 so that the engine 1 is stopped in combustion, the gear position is maintained as it is at the malfunction detection. When the switch 34k receives the neutral signal from the neutral judging section 34m, selected and serves as the target gear-position signal Gt. Accordingly, even if the gear position is neutral at detection of the malfunction, the transmission 3 can be so controlled as to be brought to the optimum gear position in compliance with the vehicle speed.

The operation of the vehicle-running control system constructed as above will be described briefly. When a malfunction occurs at the engine-combustion control device 10, the malfunction detecting unit 19 detects the malfunction, to output the malfunction detecting signal Em. The engine-combustion control device 10 responds to the malfunction detecting signal Em to suspend the fuel supply to the engine 1, thereby stopping combustion in the engine 1. As a result, it is possible to prevent reckless or uncontrolled running of the engine 1. In the vehicle-running control system according to the invention, at the stoppage of combustion in the engine 1, the gear position of the transmission 3 is forcibly brought to one other than the neutral, and the clutch 2 is forcibly brought to the engaged position. This makes it possible to transmit rotation of the axle 4 attendant upon running of the vehicle, to the engine 1. Thus, sufficient hydraulic pressure can be supplied as a power source to the power steering device 91, and sufficient vacuum or compressed air pressure can be supplied as a power source to the power brake device 92. As a result, maneuverability of the power steering device 91 and the power brake device 92 can be secured, making it possible to ensure stoppage of the vehicle and superior steering of the vehicle during a period until stoppage of the vehicle.

A microcomputer 200 (see FIG. 1) may be substituted for parts of the circuit illustrated in FIG. 1, which include, for example, the target rack position arithmetic unit 16, the pull-down logic 18 and the malfunction detecting unit 19 of the engine-combustion control device 10, the clutch control unit 23 of the clutch control device 20, and the gear-change control unit 33 and the target gear-position arithmetic unit 34 of the transmission control device 30.

Figure 5:
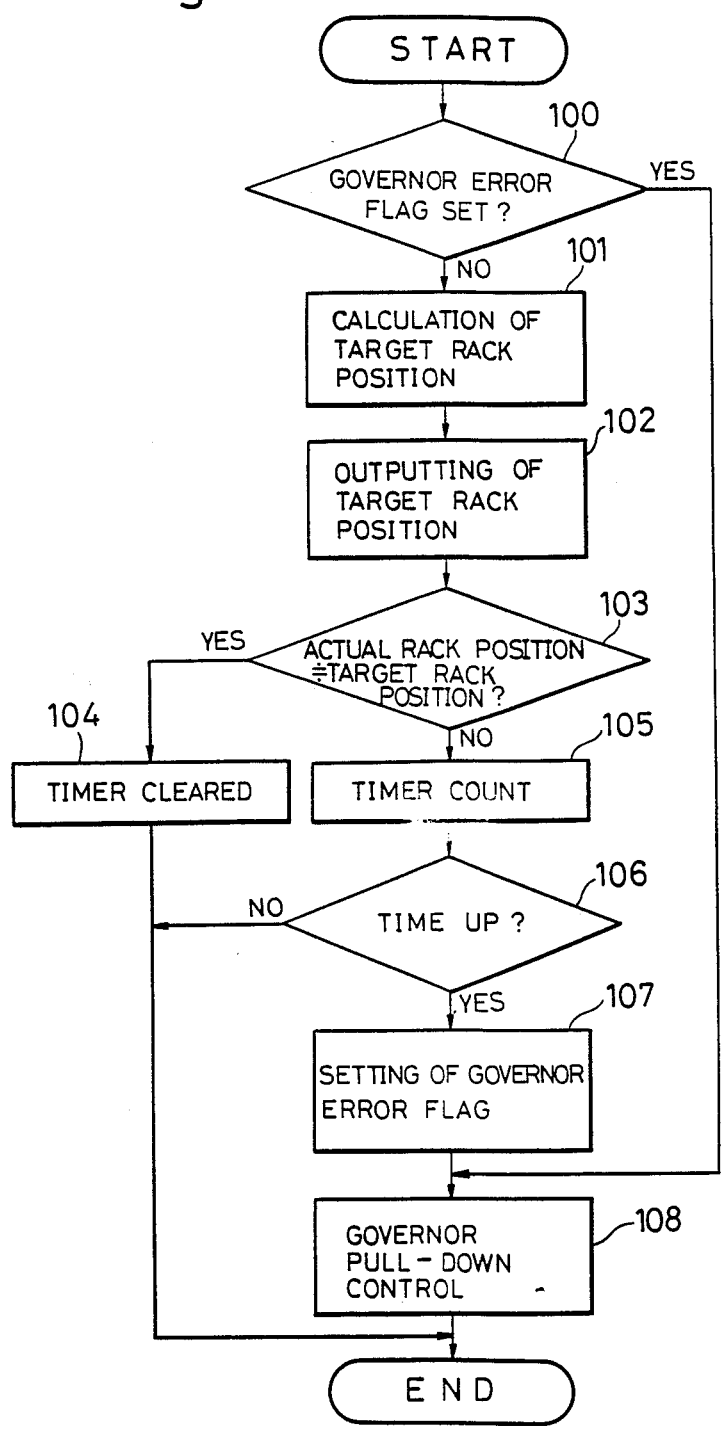
FIGS. 5 and 6 are flow charts of respective interrupt routines executed in another embodiment of the invention, which employs a microcomputer.
Figure 6:
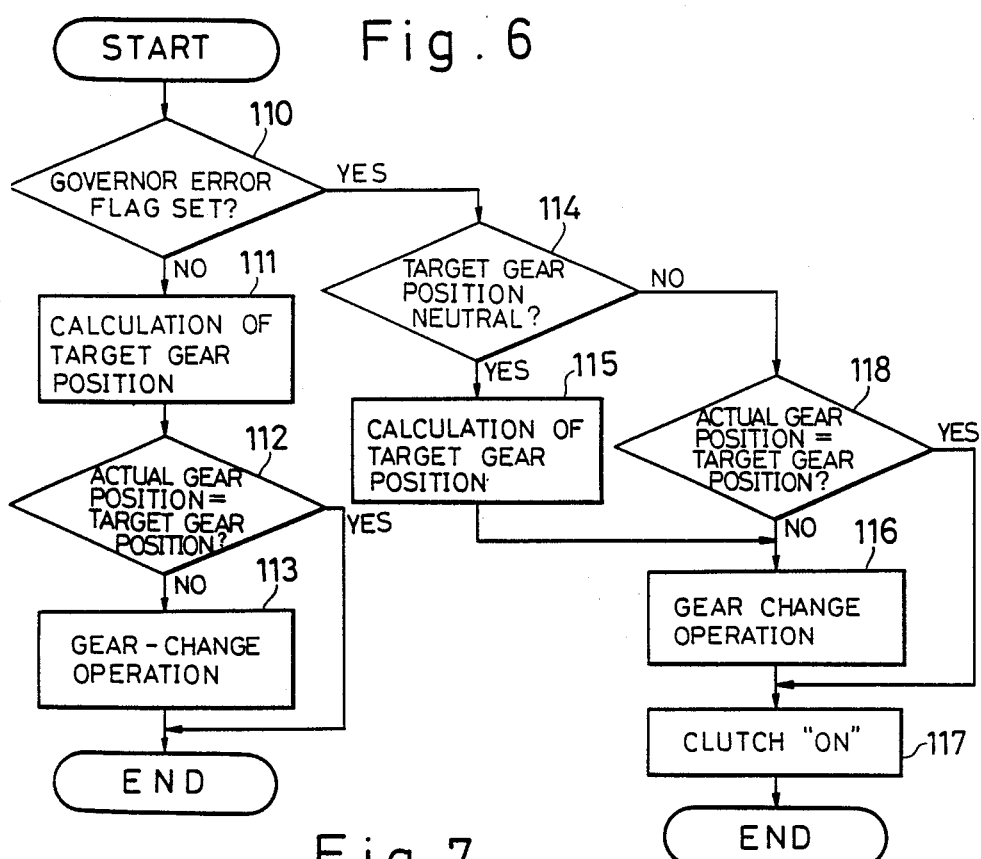

The microcomputer 200 executes interrupt routines which are started periodically, as shown respectively in FIGS. 5 and 6.

The interrupt routine shown in FIG. 5 fulfills function substantially equal to the target rack-position arithmetic unit 16 of the engine-combustion control device 10, the pull-down logic 18 and the malfunction detecting unit 19.

It is first judged at a step 100 whether or not a governor error flag is set. If the governor error flag is not set, the target rack position is calculated at a step 101, to output a signal representative of the calculated target rack position at a step 102.

Subsequently, it is judged at a step 103 whether or not a deviation between the target rack position and the actual rack position is equal to or less than a minute predetermined value, that is, whether or not both the positions are substantially equal to each other. If both the positions are equal to each other, a timer is cleared at a step 104, and the program is completed. During normal running of the vehicle, the steps 100 through 104 are repeatedly executed.

If the judgment at the step 103 indicates that the actual rack position is different from the target rack position, [1] is added to the timer at a step 105. Subsequently, it is judged at a step 106 whether or not the timer exceeds a predetermined value. If the timer does not exceed the predetermined value, the program is completed.

At the step 106, when the timer exceeds the predetermined value, that is, when a state in which the target rack position and the actual rack position are different from each other, continues for a predetermined period of time, it is judged that a malfunction occurs at the rack position sensor 17 to set the governor error flag at a step 107. Subsequently, the governor pull-down control is executed to stop combustion in the engine 1 at a step 108.

In the above interrupt routine executed successively after detection of the malfunction, setting of the governor error flag is judged at the step 100 to execute the step 108 repeatedly, thereby maintaining the stoppage of combustion in the engine 1.

The interrupt routine of FIG. 6 executed by the microcomputer 200 fulfills function substantially equal to the clutch control unit 23, the gear-change control unit 33, and the target gear-position arithmetic unit 34.

It is first judged at a step 110 whether or not a governor error flag is set. If the governor error flag is not set, the target gear position is calculated at a step 111 on the basis of the accelerator operation amount Ac, the vehicle speed Sp, and the actual gear position Gp, similarly to the first arithmetic section 34a (see FIG. 4). Subsequently, it is judged at a step 112 whether or not the actual gear position coincides with the target gear position. If the judgment is negative, a signal for the gear change operation is outputted at a step 113, and the program is completed. At the step 113, a command signal is also outputted for bringing the clutch 2 to the disengaged position during the gear change operation. If it is judged at the step 112 that the actual gear position coincides with the target gear position, the step 113 is passed, and the program is completed. During the normal running, the steps 110 through 113 are executed repeatedly.

If it is judged at the step 110 that the governor error flag is set, it is judged at a step 114 whether or not the target gear position stored in a register or a RAM is neutral. In case of the interrupt routine just after the malfunction detection, the target gear position judged at the step 114 is one calculated at the step 111 in the interrupt routine just before the malfunction detection.

If it is judged at the step 114 that the target gear position is neutral, the target gear position is calculated at a step 115 on the basis of the vehicle speed Sp similarly to the second arithmetic section 34n, to output a control signal for the gear change operation at a step 116. The step 116 includes outputting of a command signal for bringing the clutch 2 to the disengaged position just before the gear change operation. Finally, the clutch 2 is brought to the engaged position at a step 117, and the program is completed.

Since the target gear position is calculated at the step 115 in the interrupt routine just after the malfunction detection, there is no such judgment at the step 114 in the succeeding interrupt routine that the target gear position is neutral.

When it is judged at the step 114 that the target gear position is not neutral, it is judged at a step 118 whether or not the actual gear position is equal to the target gear position. If the judgment is negative, the steps 116 and 117 are executed. On the other hand, if the judgment at the step 118 is affirmative, the step 116 is passed and the step 117 is executed, so that the program is completed.

The target gear position just before the malfunction detection is substantially equal to the actual gear position at the malfunction detection. Accordingly, when the actual gear position is not neutral at the malfunction detection, the gear position is kept under the action of the steps 114 through 118. On the other hand, when the actual gear position is neutral, the actual gear position is switched to a gear position in compliance with the vehicle speed and, subsequently, the gear position is kept.

Figure 7:
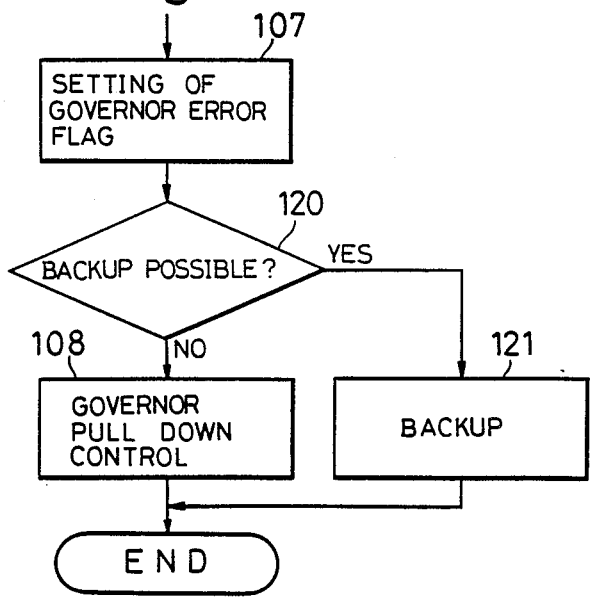
FIG. 7 is a flow chart showing a modification of the interrupt routine illustrated in FIG. 5.

Moreover, as shown in FIG. 7, steps 120 and 121 may be added to the interrupt routine illustrated in FIG. 5. That is, it is judged at the step 120 whether or not backup is possible. If possible, backup control is executed at the step 121. If impossible, the step 108 is executed similarly to the embodiment described previously. In this connection, the backup control does mean to control the control rack so as to keep the vehicle speed, for example, at the malfunction detection, in place of control of the control rack on the basis of the information on the accelerator operation amount and the engine rotational speed.

The invention is not limited to the above embodiments, but various modifications or variations can be made to the invention. For instance, the invention can equally be applied to a vehicle on which a gasoline engine is installed. In this case, combustion in the engine can be stopped by means of stoppage of ignition, full closure of a throttle valve, or the like.

The manner of detecting a malfunction at the engine combustion control device is not limited to one in the embodiment described previously. For example, when the rotational speed of the engine is raised abnormally and exceeds an allowance value, this may be detected as a malfunction.

What is claimed is:

1. A system for controlling running of a vehicle which includes an engine, a clutch coupled to said engine, said clutch being capable of occupying an engaged position and a disengaged position, a transmission coupled to said clutch, said transmission being capable of selecting a plurality of gear positions including a neutral position, shaft means drivingly connected to said transmission, wheel means mounted on said shaft means for rotation therewith, and vehicle maneuvering means employing power produced due to rotation of said engine, said system comprising:

(a) an engine-combustion control device including malfunction detecting means for detecting a malfunction of said engine combustion control device, and engine-combustion stopping means for stopping combustion in said engine in response to a malfunction detecting signal from said malfunction detecting means;

(b) a clutch control device including normal clutch control means for outputting a control signal representative of said engaged and disengaged positions of said clutch, and an actuator for actuating said clutch on the basis of a control signal from said normal clutch control means wherein said clutch control device has emergency clutch switching means which is operative in response to the malfunction detecting signal from said malfunction detecting means to output a control signal to said actuator of said clutch control device for bringing said clutch to said engage position; and (c) a transmission control device including normal transmission control means for determining a gear position of said transmission to output a control signal, and an actuator for changing the gear position of said transmission on the basis of said control signal from said normal transmission control means, wherein said transmission control device has emergency gear-position switching means which is operative in response to the malfunction detecting signal from said malfunction detecting means to output a control signal to said actuator of said transmission control device for bringing said gear position to one different from said neutral position.

2. A system according to claim 1, wherein said emergency clutch switching means has means for prohibiting switching of said clutch to said engaged position during the midst of gear change, even when said emergency clutch switching means receives said malfunction detecting signal.

3. A system according to claim 1, wherein said emergency gear-position switching means includes arithmetic means for calculating a target gear position in accordance with vehicle speed, neutral judging means for judging whether or not said transmission is neutral, and selecting means, and wherein when said neutral judging means judges that said transmission is neutral, said selecting means responds to the judgment by said neutral judging means to select the target gear position calculated by said arithmetic means, whereby the gear position of said transmission is so controlled as to be brought to said target gear position, and wherein when said neutral judging means judges that said transmission is not neutral, said selecting means selects the actual gear position at the malfunction detection as the target gear position, whereby the gear position of said transmission is maintained at the gear position at the malfunction detection.

* * * * *